United States Patent [19]

Persha et al.

[11] 4,076,400
[45] Feb. 28, 1978

[54] MICROFILM TRANSPORT WITH AUTOMATIC THREADING

[75] Inventors: Thomas J. Persha, Juneau; David Jagielski, West Bend, both of Wis.

[73] Assignee: Bell & Howell Company, Chicago, Ill.

[21] Appl. No.: 707,172

[22] Filed: Jul. 21, 1976

[51] Int. Cl.² .................. G03B 1/58; G11B 15/32; G03B 1/48
[52] U.S. Cl. .................. 353/95; 226/92; 242/195; 352/158; 352/230
[58] Field of Search .................. 353/95, 96; 352/157, 352/158, 229, 230, 178; 242/195; 74/503; 226/91, 92

[56] References Cited

U.S. PATENT DOCUMENTS

| 2,986,968 | 6/1961 | Kropp et al. | 353/95 |
| 3,604,793 | 9/1971 | Wangerin et al. | 352/229 |
| 3,620,472 | 11/1971 | Thevenaz | 352/158 |
| 3,688,960 | 9/1972 | Bunting | 352/158 |
| 3,701,595 | 10/1972 | Thomsen et al. | 352/158 |
| 3,819,129 | 6/1974 | Thevenaz et al. | 242/195 |

Primary Examiner—Steven L. Stephan
Attorney, Agent, or Firm—Robert A. Walsh

[57] ABSTRACT

A microfilm reader has a film transport mechanism driven by separate forward and reverse motors. When the forward motor first starts, power may be applied, via a one way clutch, to a capstan in order to automatically thread the film into the reader. A film gate opens as the film approaches it and thereafter closes, after the film is captured therein. A manual override gate control may prop the film gate open, if film is manually fed through the system.

14 Claims, 9 Drawing Figures

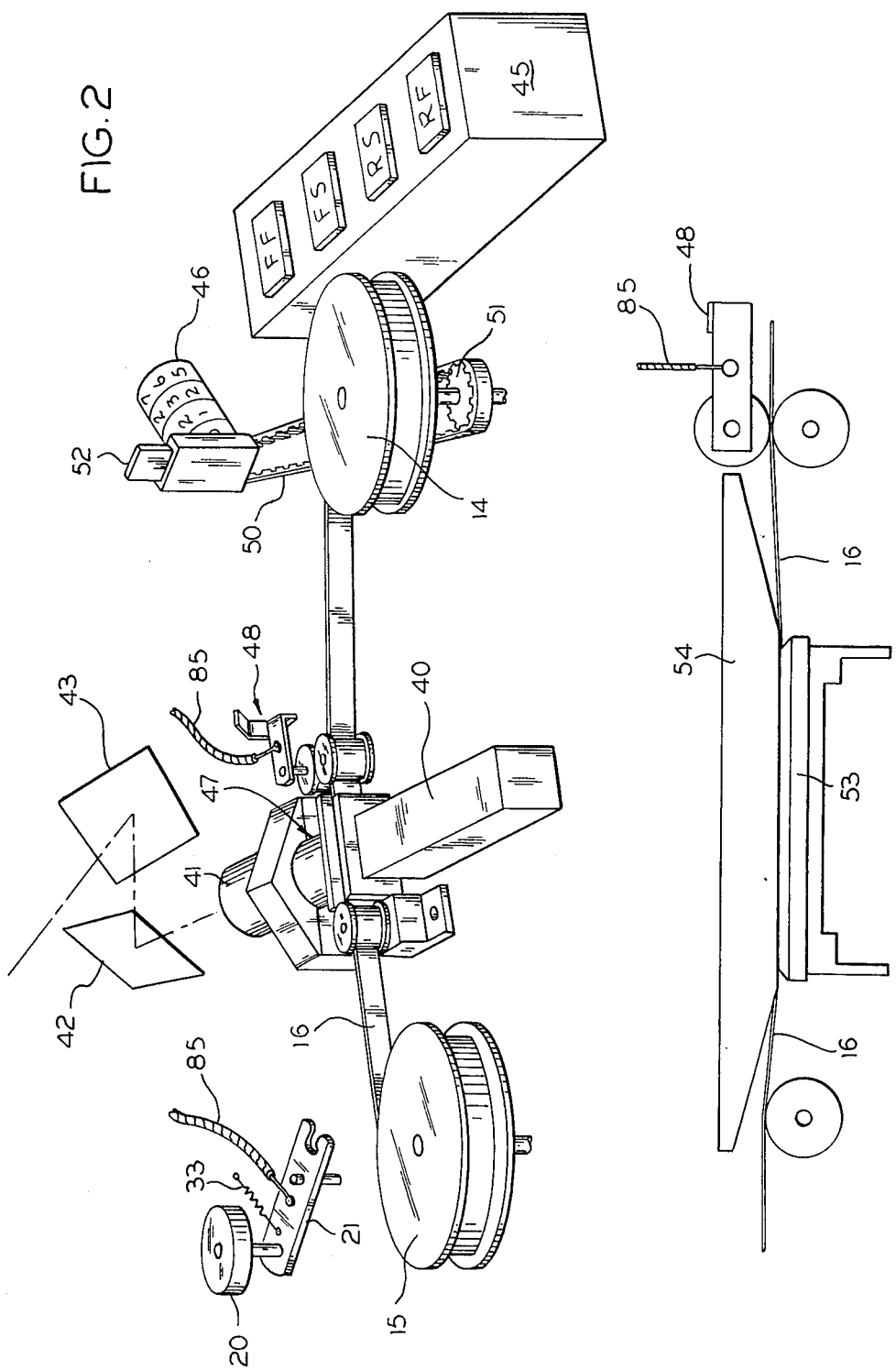

MICROFILM TRANSPORT WITH AUTOMATIC THREADING

This invention relates to microfilm readers, strip film projectors, tape recorders, and the like, and more particularly to such devices having automatic threading capabilities.

In the description which follows, it will be convenient to refer to an automatic threading of microfilm in a projector or reader. However, it should be understood that the invention relates particularly to the automatic threading aspects thereof, and that the inventive apparatus may be used anytime that film, tape, or the like must be threaded or transported. Therefore, the terms "film" and "reader" should be construed broadly enough to cover all comparable structures.

Readers and projectors of the described type have a long strip of film which is transported from a supply reel through a film gate to the take up reel. In order to automatically load the film, an automatic threading mechanism in a reader or projector should first engage and then pull the film from the supply reel, pass it through the film gate, and thereafter connect it to the take up reel. Accordingly, the threading mechanism should operate a clutch that drives the reels and should open and close the film gate at times which are coordinated with the position of the advancing end of the film.

In the process of threading film, care should be taken to be certain that the film is not scratched or otherwise damaged worn. Therefore, any wear causing surfaces in the automatic threading mechanism should engage only the edges of the film and should not engage that portion of the film which carries the image.

Accordingly, an object of the invention is to provide new and improved projectors with automatic loading capabilities. Here an object is to provide means for controlling automatic clutches and film gates.

Another object is to provide such automatic threading, with means for engaging only the edges of the film. Another object is providing self equalizing mechanisms having balanced forces, so that the mechanism engaging the edges of the film distribute wear uniformly over a maximum distance.

Still another object of the invention is to provide manual override gate control means which enables the film gate to be propped open or closed regardless of the automatic sequence built into the projector.

In keeping with an aspect of the invention, these and other objects are accomplished by an automatic threading mechanism which is engaged when the film is inserted into the reader or projector. As soon as the automatic threading process is complete or when it is time to run the film in a reverse direction, the threading mechanism is disengaged to avoid a drag upon the motor. When the advancing end of the film approaches the film gate, it opens to enable the film to pass there through. Thereafter, the film gate closes and applies a uniform retaining pressure onto the film, with a floating motion, which distributes the wear across a substantial length of film edges.

The nature of a preferred embodiment of the invention will become more apparent from a study of the attached drawing, wherein:

FIG. 2 is a perspective view of those parts of a microfilm reader which use the transport mechanism of FIG. 1;

FIG. 3 is a plan view of a film gate used in the mechanism of FIG. 2;

Figure 1:
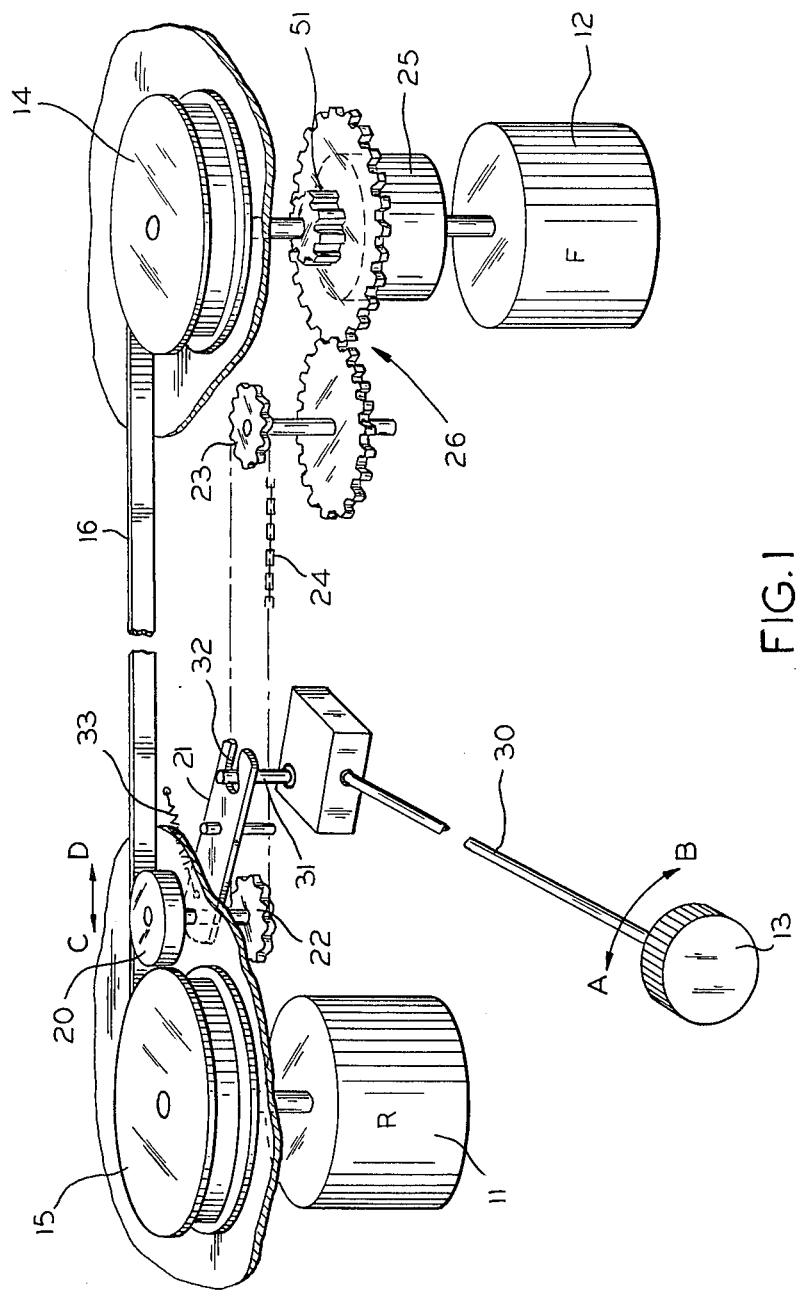
FIG. 1 is a perspective view of part of a tape transport mechanism, using the invention.

The invention film transport mechanism is shown in FIG. 1 as including a reverse motor 11, a forward motor 12, and a manual control knob 13 for controlling an automatic threading sequence. The forward motor 12 individually drives a film take up reel 14, and the reverse motor 11 individually drives a film rewind or supply reeel 15. A film 16 extends between the two reels during the operation of a microfilm reader.

The remainder of FIG. 1 is an automatic threading mechanism comprising a capstan 20 mounted on a spring biased capstan support lever arm 21 controlled by the manual knob 13. The capstan has a rubber (or the equivalent) tire and is normally held in a position remote from said supply reel, by a spring 33. A pair of sprockets 22, 23 and an interconnecting chain 24 rotates the capstan 20 whenever the forward motor 12 is operating. The sprocket 23 is driven by forward motor 12, acting via a oneway clutch 25 and gear train 26. Anytime that motor 12 is running, power is applied through clutch 25, gear train 26, sprocket 23, drive chain 24, and sprocket 22 to capstan 20.

The control knob 13 is connected to shaft 30 which has a finger 31 operatively associated therewith to move the capstan from the normal remote position to an off-normal supply reel engaging position. The finger 31 rides in a slot 32 in the end of lever arm 21.

When know 13 is manually rotated in a clockwise direction A, finger 31 moves in slot 32 to push the lever arm 21 in direction C and against the bias of spring 33. The capstan 20 is moved off-normal so that its tire is brought into contact with the outer periphery of the roll of film on the supply reel 15. If the forward motor 12 is then running, power is transmitted through clutch 25, gear train 26, sprocket 23, drive chain 24, sprocket 22, and capstan 20 to the perimeter of the film roll. The rotation of the capstan wheel 20, running on the film roll, causes the end of the film to peel off and follow a path through the reader to the take up reel 14. Any suitable means on the take up reel 14 may catch the end of the film 16 and begin to reel and wind it.

When the knob 13 is released, the spring 33 pulls the lever 21 and the capstan 20 in the direction D, away from contact with the perimeter of the roll of film 15, and back to the normal remote position shown in the drawing. The edge of the slot 32 engages and rotates finger 31 and returns the knob 13 in direction B to normal, under the urging of spring 33.

As long as the forward motor 12 continues to rotate, the capstan 20 continues to rotate. However, if the knob 13 is released, there is no substantial added load acting upon motor 12 because the capstan is in the normal remote position, where it does no work. Whenever the forward motor 12 stops rotating, the clutch 25 is released and the gear train, sprockets, and drive chain are deactivated. If reverse motor 11 thereafter begins to rotate, no power is wasted driving the capstan system backwardly through clutch 25.

FIG. 2 shows a microfilm reader using the film transport mechanism of FIG. 1. The major sub-assemblies of this readers are a light source 40, a lens barrel 41, mirrors 42, 43 for folding the optical path, a reader control panel 45, a counter 46, a film gate 47, and a manual override gate control push button 48. The light source, lens, and mirro assembly are shown in greater detail in co-pending U.S. patent application Ser. No. 675,656, filed Apr. 12, 1976, and entitled "MICROFICHE WITH VERTICAL SCAN CAPABILITY".

The counter 46 is driven by a belt 50, having internal teeth, trained over a gear 51 (driven by the forward motor 12 (FIG. 1)). As the film 16 advances, the belt 50 runs on gear 51 and the counter 46 advances to record the amount of film pulled from supply reel 15 and wound upon take up reel 14. A push button 52 resets the counter to zero.

The control panel 45 may have any suitable form. As here shown, there are push button controls for selectively driving the film transport mechanism at either fast (F) or slow (S) speeds and in either forward (F) or reverse (R) directions. The circuits and mechanism for accomplishing this drive control function are shown in a copending U.S. patent application Ser. No. 707,172, filed July 12, 1976, and entitled "VARIABLE SPEED AC MOTOR, CONTROL CIRCUIT".

The remainder of the components in FIG. 2 comprise the automatic and manual means for operating the film gate 47, the details of which are shown in FIGS. 3–9.

Figure 5:
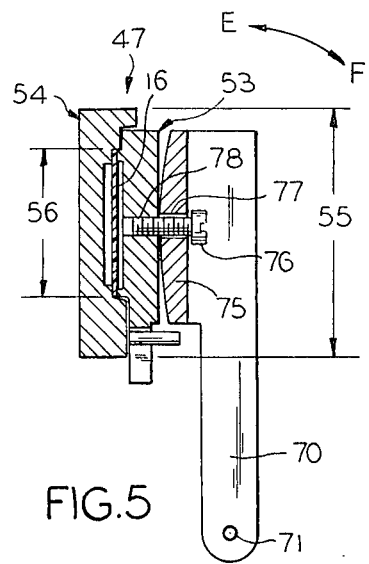
FIG. 5 is a side elevation (partly in cross section) of the film gate in a closed position.

In greater detail, the film gate 47 comprises a movable portion 53 and a stationary back up portion 54 (FIG. 3). Both portions have a total vertical height 55 which is greater than the width 56 of film 16 (as best seen in FIG. 5. In their normal position, the movable gate 53 and stationary backing plate 54 come together, under spring bias, in a face to face contact. When the gate 53 opens against spring bias, the film may be easily fed into a projecting position.

Means are provided in the film gate for gripping the film along only its edge areas and not in the inner area where images appear. More particularly, the contours of the backing plate 54 provide upper and lower tracks 62, 63 with a recessed window area 64, as a relief area between them. Likewise, the gate 53 also includes upper and lower tracks 65, 66 to form a relief window 67 between them. This way, only the edges of film 16 are held between the opposing tracks 62, 63, 65, 66. The front and back relief areas 64, 67 enable the film to move through the gate without any danger of the image being contacted by the adjoining mechanism while it is in the film gate area.

The film gate 53 is supported by a pair of elongated arm members 70, 70 which are pivotally mounted at 71, thus enabling the gate 53 to undertake a swinging motion in directions E, F. Hair springs or clock springs 72, 73 bias arms 70 in direction E, so that the film gate 53 is normally in contact with the stationary backing plate 54. Therefore, the film gate support arms 70 swing the film gate in the opening direction F, only while a force is mechanically applied thereto.

Means are provided for applying an equal and balanced force upon the film, while it is in the gate, in order to equalize and distribute wear upon the film. In greater detail, the face plate 75, of the film gate support arms 70, has a convex contour so that the film gate 53 is free to rock in virtually any direction relative to the plane of the backing plate 54. A pair of screws 76 pass loosely through holes 77 in the convex film gate face plate 75 and threads into a mating hole 78 in the film gate 53. Therefore, when the film gate support arms 70 hold gate 53 against backing plate 54, the gate rocks to a position of minimum potential and equilibrium. This rocking insures a smoother and more equal application of pressure upon the film, while the film gate 53 is closed.

Figure 4:
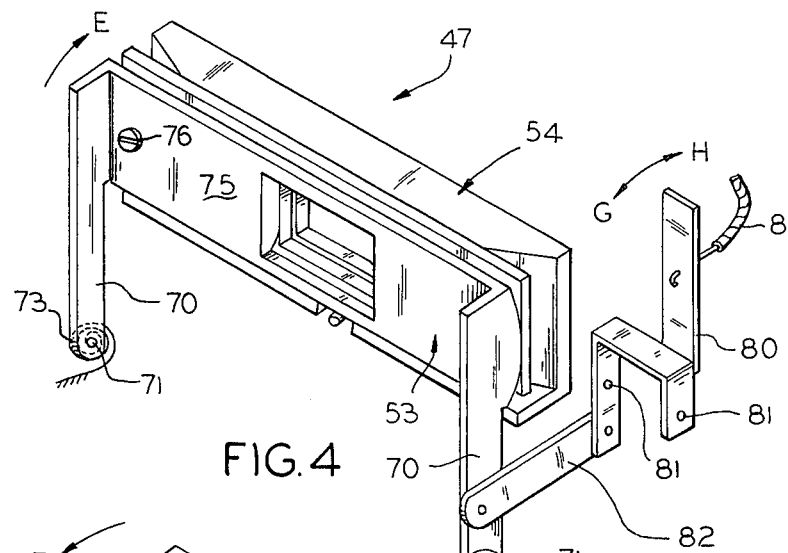
FIG. 4 is a perspective view of the film gate in a closed position.
Figure 6:
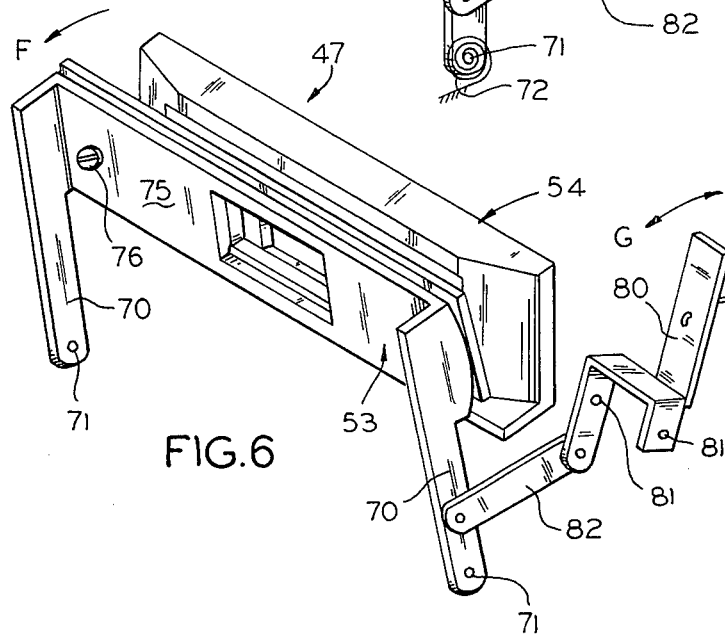
FIG. 6 is a perspective view of the film gate in an open position.
Figure 7:
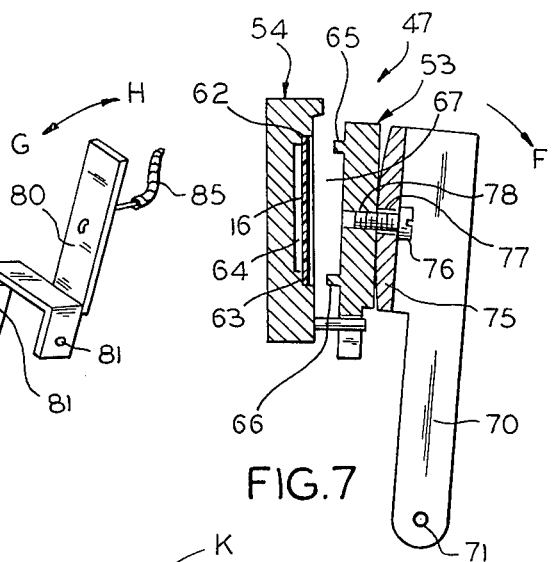
FIG. 7 is a side elevation (partly in cross section) of the film gate in open position.

The automatic gate operating mechanism is best seen in FIGS. 4, 6. More particularly, an actuator lever arm 80 is pivotally mounted at 81 to swing back and forth in directions G, H. Link 82 pivotally interconnects lever arm 80 and film gate support arm 70. From an inspection of FIGS. 4, 6, it should be apparent that, when the actuator lever arm 80 swings in direction H, the film gate support arm 70 swings in direction F; or, if lever arm 80 swings in direction G, support arm 70 swings in direction E.

A cable 85 extends from the capstan support arm 21 (FIGS. 1, 2) to the lever arm 80. Accordingly, cable 85 and lever arm 80 are pulled when the knob 13 of FIG. 1 is rotated in direction A to move the automatic threading capstan 20 into contact with the roll of film on the supply reel 15. Likewise, under the pull of spring 33, cable 85 and lever 80 is released and returned to normal when knob 13 is rotated in direction B to remove capstan 20 from its contact with the film on the supply reel 15. It should now be apparent that the film gate opens during automatic threading and closes after automatic threading, both motions being under control of the rotation of knob 13.

Means are provided for giving a manual override gate control is it becomes necessary or desirable to open the film gate without simultaneously moving capstan into contact with the film on the supply reel. In greater detail, the gate control lever arm 80 extends upwardly through an opening 89 (FIGS. 8, 9) in top panel 90 of the microfilm reader or projector. The upper end of arm 80 is hooked at 91 so that it fits into a cavity 92 and captures a thumb operated, tab member 93, having a crosssectional shape best seen in FIGS. 8, 9.

Figure 8:
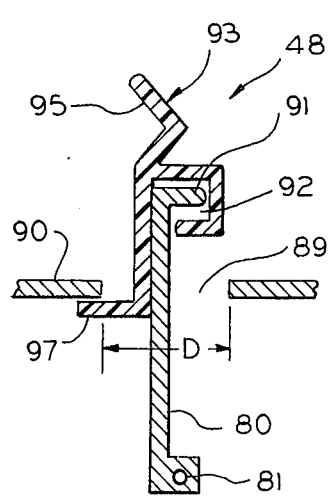
FIG. 8 is a cross section view of the manual override film gate control tab or push button, when in a gate closed position.
Figure 9:
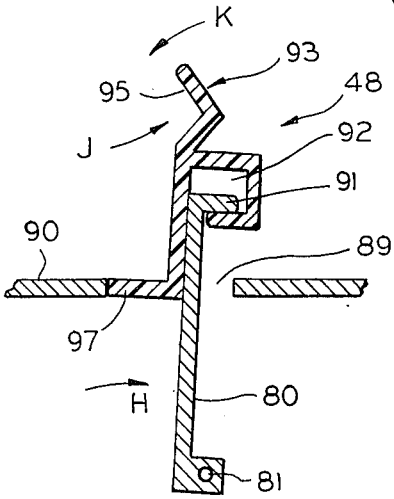
FIG. 9 is a cross section view of the same manual override tab or push button in a gate propped open position.

It should be apparent from an inspection of these two figures that the thumb tab member 93 may move up or down by the discrete distance which is permitted by the movement of hook 91 within the cavity 92. FIG. 8 shows thumb tab member 93 in a lowered or unoperated position and FIG. 9 shows the tab member 93 in a raised or gate opened position.

The thumb tab member 93 has an upper fin 95 which is set at such an angle that if an operator places his thumb under it and pushes in direction J, the lever arm 80 swings in direction H to open the film gate 53. Also, responsive to a force exerted in direction J, the thumb tab 93 lifts from the position of FIG. 8 to the position of FIG. 9. The relative dimensions of the hole 89 diameter D and the thumb tab geometry, are such that a horizontal prop or foot 97, formed on thumb tab 93, raises into and rests against the side of the hole 89. This props the gate open.

To close the gate, the operator rests his finger on the back of fin 95 and applies pressure in direction K. This pushes the thumb tab foot 97 out of the hole 89 and closes the film gate 53.

Those who are skilled in the art will readily perceive how the described embodiment may be modified; therefore, the appended claims are to be construed to cover all equivalents which fall within the true scope and spirit of the invention.

We claim:

1. An automatic threading device for a microfilm reader comprising a film transport mechanism having at least a supply reel and take up reel, means for driving said take up reel to pull film from said supply reel and move it through said transport mechanism, capstan means driven simultaneously with the driving of said take up reel for selectively engaging or disengaging the perimeter of a film roll on said supply reel, when engaging said perimeter, said capstan peeling off said film and causing it to follow a path through said reader to said take up reel, and one-way clutch means interposed between said take up reel and said capstan for transmitting a driving force to turn said capstan means only when said film moves in a direction which feeds it to said take up reel.

2. The device of claim 1 and film gate means interposed between said supply and take up reels for guiding and directing said film as it travels through said transport mechanism, and means for automatically opening said gate means when said capstan engages the perimeter of said film roll and closing said gate means when said capstan disengages said perimeter.

3. The device of claim 2 wherein said film gate comprises a stationary plate and a movable plate, a pair of track means formed on each of said plates for engaging only the upper and lower edges of said film as said film moves through said gate, and means for floatingly urging said movable plate against said stationary plate, whereby the forces exerted by said tracks upon said film are equalized across the width of said plates.

4. The device of claim 3 and a pivoted arm having said movable plate mounted on said arm, said arm swinging relative to said stationary plate to move said movable plate between film gate open and film gate closed positions, and cable means extending from said capstan to said movable plate for selectively swinging said arm responsive to movement of said capstan between said engaging and said disengaging positions.

5. The device of claim 4 and manual override film gate control means movably attached to said pivoted arm, said manual override means operating responsive to forces applied in one direction for opening said gate and moving said manual override means to an interference position for propping open said gate, and operating responsive to forces applied in an opposite direction for moving said manual override means away from said propping position and thereby enabling said gate to close.

6. The device of claim 5 wherein said pivoted arm has a hook at the non-pivoted end, a push-button cap having a hook receiving cavity therein for enabling a longitudinal cap movement along the length of said arm, whereby said cap may raise or lower within the cavity, a force receiving fin formed on said cap and set at an angle relative to said arm, said angle causing said cap to move longitudinally in one direction along the length of said arm and causing said pivoted arm to swing in one direction responsive to a force acting on said fin in said one direction, and causing said cap to move longitudinally in an opposite direction along the length of said arm and for enabling said arm to swing in an opposite direction responsive to said force acting in an opposite direction.

7. The device of claim 6 and a panel having a hole of predetermined dimensions formed therein, said arm passing through said hole, an extension on said cap for engaging a side of said hole when said cap moves longitudinally in said one direction, thereby propping said lever arm in the position to which it swings in said one direction.

8. A film transport mechanism comprising two motors, means responsive to one of said motors for individually driving a film take up reel, means responsive to the other of said motors for individually driving a film supply reel, a capstan means comprising a wheel normally supported in a remote position, in which remote position said capstan wheel engages and drives the film through said mechanism, automatic threading means selectively operated for moving said capstan wheel away from said remote position to a position where the capstan engages the periphery of the film wound on said supply reel, and means responsive to release of said automatic threading means from its operated position for moving said capstan back to said remote position.

9. The mechanism of claim 8 and means responsive to said one motor for driving said capstan via a one-way clutch which is engaged only when said one motor is operating and not engaged when the other of said motors is operating.

10. The mechanism of claim 9 and film gate means for guiding and directing said film as it travels through said transport mechanism, said film gate comprising a stationary plate and a movable plate, means formed on both of said plates for engaging only the upper and lower edges of said film as said film moves through said gate, means for opening said gate means when said capstan engages the perimeter of said film roll, means for floatingly urging said movable plate against said stationary plate when said capstan disengages said perimeter whereby the forces exerted upon said film are equalized across the width of said plates, and manual override film gate control means operating responsive to forces applied in one direction for propping opening said gate and operating responsive to forces applied in an opposite direction for moving said manual override means away from said propping position.

11. A film gate means for guiding and directing film as it travels through a film transport mechanism, means for opening said gate means when a free end of film advances toward said gate and for closing said gate when said free end has passed through said gate, said film gate comprises a stationary plate and a movable plate, means formed on both of said plates for engaging only upper and lower edges of said film as said film moves through said gate, means for floatingly urging said movable plate against said stationary plate whereby the forces exerted by said gate upon said film are equalized across the width of said plates, said means for floatingly urging said plate comprising a pivoted arm having a convex plate at the free end thereof, said movable plate being mounted on said convex plate in order to rock to a minimum equilibrium position as said pivoted arm swings between open and closed gate positions, and means extending from the film transport mechanism to swing said pivoted arm and movable plate upon the threading of film through said transport mechanism.

12. The film gate of claim 11 wherein said movable plate and said stationary plate contain apertures free of glass for forming a format area to display an image on said film. pg,23

13. The gate of claim 11 and manual override film gate control means movably attached to said pivoted arm, said manual override means operating responsive to forces applied in one direction for opening said gate and moving said manual override means to an interference position for propping open said gate, and operating responsive to forces applied in an opposite direction for moving said manual override means away from said propping position and thereby enabling said gate to close.

14. A push button comprising a lever arm pivoted on one end having a hook at the other end, a push-button cap having a hook receiving cavity therein for enabling a longitudinal cap movement along the length of said arm, whereby said cap may raise or lower within the confines of said cavity, a force receiving fin formed on top of said cap and set at an angle for causing said cap to move longitudinally in one direction along the length of said arm and for pivoting said arm in one direction responsive to said force acting upon said fin in one direction and for causing said cap to move longitudinally in an opposite direction along the length of said arm to enable said arm to swing in an opposite direction responsive to said force acting upon said fin in an opposite direction.

* * * * *